UNITED STATES PATENT OFFICE.

GUSTAVE GIN, OF PARIS, FRANCE.

PROCESS OF MANUFACTURING FERROSILICON AND SILICOSPIEGEL.

SPECIFICATION forming part of Letters Patent No. 712,925, dated November 4, 1902.

Application filed April 17, 1901. Serial No. 56,315. (No specimens.)

*To all whom it may concern:*

Be it known that I, GUSTAVE GIN, engineer, a citizen of the French Republic, residing at Paris, France, (whose post-office address is 43 Rue de Levis, XVII arrondissement, in said city,) have invented certain new and useful Improvements in Processes of Manufacturing Ferrosilicon and Silicospiegel, of which the following is a specification.

This invention relates to the manufacture of ferrosilicon and silicospiegel from the silicon slags from metallurgical operations in the converters used in the Bessemer acid process and in the Martin furnaces with silicon coating. The slags contain, besides a certain proportion of iron, almost the whole of the elements which are more oxidizable than iron, and especially the metals of the alkaline earths—silicon, titanium, and manganese—which existed previously in the ore or have been introduced during the process. By regenerating these elements it is possible to obtain from by-products which are generally worthless silicides of iron or manganese, which enable a new cycle of refining operations to be carried on. The iron and manganese contained in the slags are in the state of protoxids, the reduction of which requires less carbon and a lesser consumption of energy than the reduction of the ores in which these metals are in a more oxidized state. Moreover, there is the saving of the heat units required to evaporate the combination of hygroscopic water contained in the ores, for this water cannot possibly exist in the slags obtained in the metallurgical process. The approximate composition of the slags of the acid Bessemer furnaces is silicate, 50.85; alumina, 3.15; iron monoxid, 4.13; monoxid of manganese, 40.68; and the approximate composition of the slags of the Martin furnaces with silicon coating is $SiO_2$, 50.42; FeO, 34.10; MnO, 9.92; $Al_2O_3$, 2.26; CaO, &c., 3.30; and as the slags of the acid Bessemer or Martin process contain little or no phosphorus a most important feature of the invention is that it is possible to obtain silicides which contain but insignificant quantities of phosphorus and are consequently most suitable for metallurgical operations. With regard to the previous application of slags these have never been utilized save in the manufacture of iron in which accumulation of slag from old low-refining hearths and phosphorous slags from puddling-furnaces have been utilized. Generally speaking, this further use of slags in blast-furnaces can only take place after a preliminary roasting, which superoxidizes the iron and sets free the silica. The combination of the metallic oxids with silicon renders them refractory to the action of the reducing-gases, and their use is only possible after a dissociation by a liquation and superoxidation process, which produces a true iron ore which is separated for use in manufacture. As regards iron alloys it has not so far been possible with the resources of ordinary metallurgy to manufacture them directly from slag, and the main obstacle to this regeneration resides in the difficulty experienced in separating metals by the sole action of reducing-gases; but the reduction of the slag by the electric furnace is, on the contrary, very easy and does away with the aforesaid disadvantage. It has been proposed to extract from the blast-furnaces slag carbid of calcium and cast-iron; but this use is not in affinity with the particular manufacture of silicides obtained with a particular slag. The novel utilization of these by-products realizes a new industrial result, which may be summarized as follows: first, utilization of a worthless by-product of manufacture and the obtainment therefrom of a valuable product; second, important saving in the expenditure of energy and reducing carbon in consequence of the lesser degree of oxidation of the metals which are reduced at the same time as the silicon; third, possibility of obtaining ferrosilicon and silicospiegel almost free from phosphorus, which constitutes an important progress on the old processes.

In order that the nature of my invention may be clearly understood, I will now describe the manner of carrying out the same.

Let it be supposed that the slags to be treated come from the Martin furnaces having an acid lining and that they have the following composition: $SiO_2$, 50.42; FeO, 34.10; MnO, 9.92; $Al_2O_3$, 2.26; CaO, &c., 3.30, which may correspond per ton to the following formula:

$$8.400\ SiO + 3.800\ FeO + 1.400\ MnO + 220\ Al_2O_3 + 600\ CaO.$$

I add to the slag, which has been pulverized, a quantity of carbon, so that the mixture contains one molecular proportion of carbon for each molecular proportion of oxygen in the silicate and the iron and manganese protoxids without taking care of the alumina and the oxids of alkaline earths. To the slag under consideration it will therefore be necessary to add $8,400 \times 2 + 3,800 + 1,400 = 22,000$ atoms of carbon. This can be done by introducing to the previously-pulverized slag the required quantity of coal, &c. The mixture is then subjected to the heat of a continuous or alternating current electric furnace. The most favorable voltage ranges from twenty-five to thirty volts, and the power density (the number of watts per square centimeter of the perpendicular cross-section of the electrode) should not exceed seventy watts if it be wished to reduce to its lowest practical limit the volatilization of the silicon and of the manganese. Under these conditions there are not metallic carbids produced, but a bath of ferrosilicon or silicospiegel is obtained, which is run into ingot-molds at intervals. In order that the operation may be carried on continuously, it will suffice to feed the electric furnace regularly with the aforesaid mixture.

I do not limit myself to the precise details described in carrying out my said invention, as, for example, the proportion of carbon may be varied for various kinds of slags in order to restrain the amount of silicon in the ferrosilicons obtained, and the conditions of application of the electric current used in the reduction may also be varied.

Having now particularly described and ascertained the nature of this invention and in what manner the same can be carried into effect, I declare that what I claim is—

A process of manufacturing ferrosilicon and silicospiegel from silicon slags of the Bessemer or Martin furnaces with silicon coating, consisting in treating the slags which have been pulverized in an electric furnace after an addition of carbon to the slags in a quantity of one molecular proportion of carbon for each molecular proportion of oxygen for reducing silicate and metallic oxids and producing metallic silicides.

In testimony whereof I have hereunto set my hand in presence of two subscribing witnesses.

GUSTAVE GIN.

Witnesses:
HENRY SCHWAB,
EDWARD P. MACLEAN.